Sept. 2, 1969     A. YARIV ET AL     3,465,166
FAR INFRA-RED COHERENT LIGHT GENERATOR
Filed Feb. 1, 1966
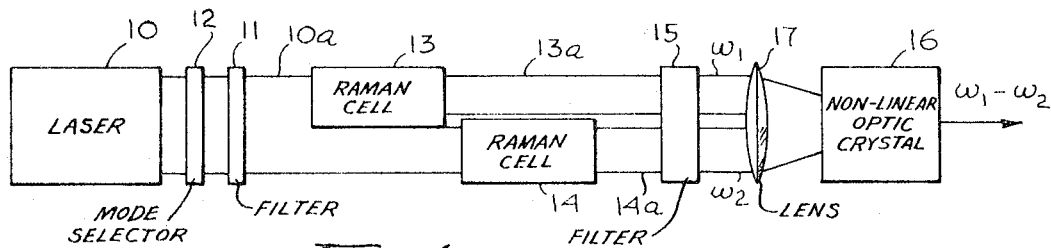
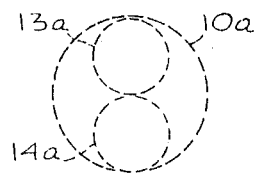
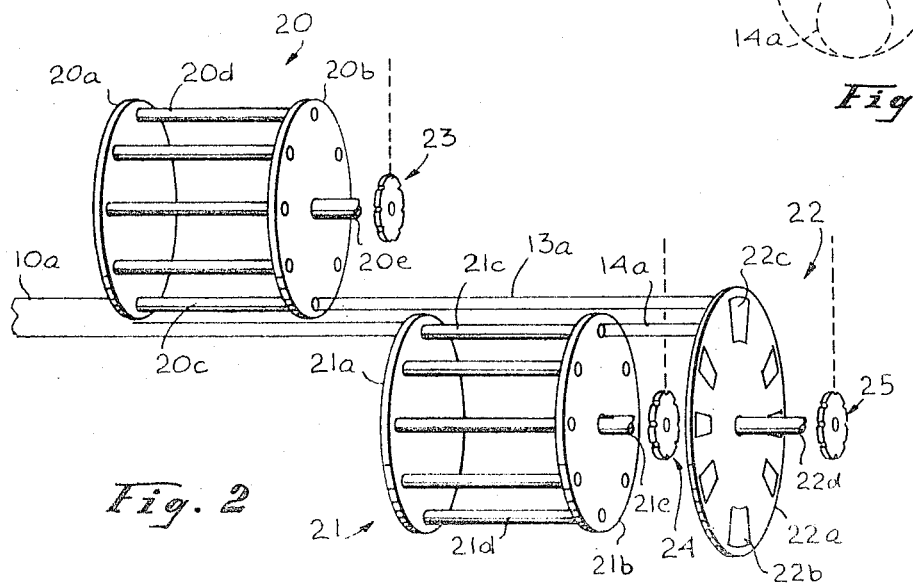
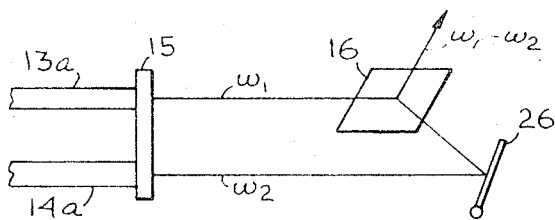
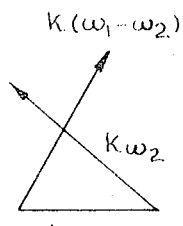
INVENTORS
FRED M. JOHNSON
AMNON YARIV
MOSTAFA A. EL SAYED
BY Allen E. Botney
ATTORNEY

United States Patent Office 3,465,166
Patented Sept. 2, 1969

3,465,166
FAR INFRA-RED COHERENT LIGHT GENERATOR
Amnon Yariv, Altadena, Fred M. Johnson, Pasadena, and Mostafa A. El Sayed, Los Angeles, Calif., assignors, by mesne assignments, to Xerox Corporation, a corporation of New York
Filed Feb. 1, 1966, Ser. No. 524,144
Int. Cl. H02m 5/16
U.S. Cl. 307—88.3        11 Claims

ABSTRACT OF THE DISCLOSURE

An infra-red coherent light generator comprising a laser light source, a pair of Raman cell chambers receiving the light from such source and generating two light beams whose frequency difference is the desired infra-red frequency, and a non-linear optic crystal which mixes the two light beams to produce the desired infra-red light beam.

---

The present invention relates in general to the laser field and more particularly relates to laser apparatus for generating high power light beams in the infra-red range.

Laser beams generated in the infra-red region unquestioningly have great utility. However, a major shortcoming of infra-red generators found in the prior art is that they are of low power, which thereby restricts their usage in many areas where they could otherwise find extensive application. Another factor that limits their utility is their non-tunability. The present invention significantly improves upon this condition by providing laser apparatus capable of generating a high-power light beam in the infra-red range. By way of example, certain specific gas lasers found in the prior art, such as the $CO_2$ gas laser, are capable of generating only up to 100 watts of power, but even then only in a very narrow frequency range. Again, where globar sources or infra-red lamps are employed, the amount of power obtained is far below the microwatt level. By means of the present invention, on the other hand, power in the kilowatt range can be obtained, which far surpasses the capabilities of anything found in the prior art. Furthermore, a singularly advantageous feature of the present invention is that it is tunable, with the result that its output beam can be generated over a large frequency spectrum. Such a feature is non-existent in the prior art.

It is, therefore, an object of the present invention to provide a laser system for generating light beams in the infra-red region at high-power levels.

It is an additional object of the present invention to provide laser apparatus that is tunable over the infra-red frequency spectrum.

It is a further object of the present invention to provide infra-red laser apparatus that is adjustable as to beam power and frequency.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only and is not intended as a definition of the limits of the invention.

FIGURE 1 is a block diagram that schematically illustrates the basic structure of the present invention;

FIGURE 1a is an end view that schematically illustrates the positions of the Raman cell chambers in the FIG. 1 apparatus relative to the generated laser beam;

FIGURE 2 illustrates an improvement of the FIG. 1 apparatus by means of which infra-red beams may selectively be generated over a range of frequencies;

FIGURE 3 illustrates a modification that may be introduced in the FIG. 1 or FIG. 2 apparatus; and FIGURE 3a is a vector diagram associated with the FIG. 3 modification.

For a consideration of the invention in detail, reference is now made to the drawing wherein like or similar parts or elements are given like or similar designations throughout the several figures. In FIG. 1, the embodiment is shown to include a Q-spoiled high-power laser 10, an optical filter 11 positioned in front of the laser and a mode selector 12 positioned between the laser and the filter. Also included is a pair of Raman gas/liquid cell chambers respectively designated 13 and 14, an optical filter 15 positioned in front of the Raman cells, a non-linear optic crystal 16 for difference frequency generation, and a lens arrangement 17 mounted between the filter and the crystal. Q-spoiled laser 10 is preferably a neodymium or ruby pulsed laser which is capable of periodically putting out or producing a very high-power pulse of light which, in the figure, is indicated by the designation 10a. This laser pulse first passes through mode selector 12 which sharpens the pulse and then through optical filter 11 which, as its name suggests, eliminates undesirable frequency components of light that may be present.

The laser beam 10a is next applied to gas or liquid Raman cell chambers 13 and 14 which are positioned in the path of the beam, as illustrated both in FIGS. 1 and 1a. By means of stimulated Raman scattering, a number of coherent sideband frequencies are thereby provided that are not directly obtainable from lasers, the particular sideband frequencies produced by each Raman cell chamber being determined by the material contained therein. Stated differently, when a giant laser beam of frequency $\omega_L$ is focused inside a liquid or a gas at reasonably high pressure, the scattered radiation is found to contain intense coherent light at frequencies equal to $\omega_L \pm n\omega_i$, where $\omega_i$ is a certain characteristic Raman active vibration frequency of the material in the cavity or chamber, and $n$ is an integer. In the present case, the respective Raman cell materials are chosen so that the difference between selected sideband frequencies will fall into the infra-red frequency domain.

Raman emission and the principles thereof are discussed in an article by M. Geller, D. P. Bortfeld and W. R. Sooy, entitled "New Woodbury-Raman Laser Materials," published on Aug. 1, 1963 in vol. 3, No. 3 of Applied Physics Letters, commencing on page 36 thereof. See also the article by B. P. Stoicheff commencing on page 186 of Physics Letters, vol. 7, published in 1963.

However, notwithstanding these references, it is deemed worthwhile to mention that vibration that gives rise to stimulated Raman emission should satisfy the following conditions:

(1) It should be strongly active in the ordinary Raman process. (These vibrations should greatly change the molecular polarizability, e.g., totally symmetric vibrations.)

(2) The linewidth of the normal scattered Raman line should be narrow.

The above selection rules arise from the following considerations.

The probability of absorption of light of frequency $\omega_L$ and emission of light of frequency $\omega_R$ (where $\omega_R = \omega_L \pm n\omega$) is given by $$P = \frac{16\pi^4}{h^4} \int |\mu|^2 \rho(\omega_L) \left[ \rho(\omega_R) + \frac{8\pi h \omega_R{}^3}{C^3} \right] d\omega_L$$

when $\rho_{(\omega_L)}$ and $\rho_{(\omega_R)}$ are the energy densities at $\omega_L$ and $\omega_R$ respectively, $\mu$ is the well-known matrix element for two photon processes and gives the magnitude of the change of the polarizability during a vibrational mode of frequency $\omega_i$. The term $$\int \frac{16\pi^4}{h^4}|\mu|^2\rho(\omega_L)\cdot\frac{8\pi h\omega_R^3}{C^3}d\omega_L$$

measures the normal spontaneous Raman scattering probability. The term $$\int \frac{16\pi^4}{h^4}|\mu|^2\rho(\omega_L)\rho(\omega_R)d\omega_L$$

measures the probability of the stimulated Raman scattering process. From this latter term it is obvious that the intensity of the stimulated Raman lines is proportional to the following quantities:

(1) $|\mu|^2$, which measures the degree of change in the molecular polarizability by changing the normal coordinate of the particular vibration mode under consideration.

(2) $\rho(\omega_L)$, the energy density of the laser used. In ruby or Nd giant lasers, powers of $\sim 100$ megawatt are easily attainable.

(3) $\rho(\omega_R)$, the energy density of the Raman line itself. This is sensitive to the line width.

Results indicate that up to 50 percent of the orignal laser beam intensity can be converted into Raman lines. Thus, if ten lines appear from scattering in a certain liquid, each line would contain 5 percent of the original beam. With the original laser beam having a peak power of $\sim 100$ megawatts, stimulated Raman lines can be obtained with power up to 5 megawatts. Generally, however, the power would be smaller than this value, but even a line with an order of magnitude smaller power than 5 megawatts (i.e., ½ megawatt) still has very high intensities on the absolute scale.

The light beams out of Raman cell chambers 13 and 14, respectively designated 13a and 14a, are incident upon optical filter 15 whose passband characteristic is designed to overlap the frequency domain of both beams in such a manner that light at only two frequencies are passed through, the difference between these two frequencies lying in the infra-red region. In other words, filter 15 is designed to pass light at only one frequency from each beam, the difference frequency of the light thusly passed by the filter being infra-red. As has been intimated, the components of light out of the filter 15 are focused by lens arrangement 17 onto crystal 16 which mixes the beams together to produce the desired difference frequency. In essence, therefore, the Raman lines stimulated from one compound can be mixed with those scattered from another compound to give a far infra-red line.

Appropriate compounds can be selected which possess a number of vibrational frequencies $\omega_1, \omega_2, \omega_3 \ldots$ which show laser action and for which the frequency difference between the different modes falls in the desired far infra-red range, i.e., $\omega_1-\omega_2, \omega_1-\omega_3, \omega_1-\omega_n; \omega_2-\omega_3 \ldots \omega_2-\omega_n; \omega_3-\omega_n = 30-400$ cm.$^{-1}$. By mixing a certain pair of these lines, a predetermined far infra-red frequency can be obtained. The table below gives the range of far infra-red frequencies that can be obtained from mixing the stimulated Raman lines of a few liquids. The left side of the diagonal of the table is not filled since the values are symmetrical to reflection through the diagonal and perpendicular to the molecular plane (if the signs are left out). From this table, it is obvious that these liquids can produce a far infra-red light source in the frequency ranges, 8-39, 53-124, 135-185, 188-219, 193-233, 228-259, 267, 286-317, 325, 350, 363, 378, 408 cm.$^{-1}$. A number of the molecules given in the table are known to show strong stimulated Raman emission, e.g., cyclohexane, benzene, and some of its substituted derivatives.

FAR INFRA-RED FREQUENCIES GENERATED BY NONLINEAR MIXING OF STIMULATED RAMAN LINES OF DIFFERENT LIQUIDS

| | 1028 cm.$^{-1}$ | 970 | 930 | 913 | 795-835 | 802 | 711-742 | 703 | 650 | 620 |
|---|---|---|---|---|---|---|---|---|---|---|
| Trimethylene oxide: 1028 | 0 | 58 | 98 | 115 | 233-193 | 226 | 317-286 | 325 | 378 | 408 |
| Cyclobutane: 970 | 8 | 0 | 40 | 57 | 185-135 | 168 | 259-228 | 267 | 320 | 350 |
| Tert. butyl group: 930 | | | 0 | 17 | 135-95 | 128 | 219-188 | 227 | 280 | 310 |
| Tetrahydrofuran: 913 | | | | 0 | 118-78 | 111 | 202-171 | 210 | 363 | 293 |
| Isopropyl group: 795-835 | | | | | 0 | 7-33 | 53-124 | 92-132 | 145-185 | 175-215 |
| Cyclohexane: 802 | | | | | | 0 | 91-60 | 99 | 152 | 182 |
| 1,2 or 1,3 di and 1,2,4 trisubstituted benzene 742-711 | | | | | | | 0 | 39-8 | 92-61 | 112-91 |
| Cyclo-octane 703 | | | | | | | | 0 | 53 | 83 |
| 1,2,3 trisubstituted benzene 650 | | | | | | | | | 0 | 30 |
| Monosubstituted benzene 620 | | | | | | | | | | 0 |

Appropriate mixing crystals may be found among the perovskite-type ferroelectrics, and the properties of these may be found in an article entitled "Electro-Optic Properties of Some ABO$_3$ Perovskites in the Paraelectric Phase" by J. E. Geusic, S. K. Kurtz, L. G. Van Uitert and S. H. Wemple, published in Applied Physics Letters, vol. 4, No. 8, Apr. 15, 1964. With respect to lens arrangement 17, the use of long focus lenses is preferred since the amount of infra-red power obtained will thereby be greatly increased.

In the FIG. 1 system, only one pair of Raman cells and only one filter are employed so that the system is limited to generating at only one frequency in the infra-red range. However, there is no reason why such a system should be limited in this manner and an arrangement by means of which beams can be produced at any one of a number of infra-red frequencies is illustrated in FIG. 2 to which reference is now made. As shown therein, the arrangement includes a pair of rotatably mounted squirrel-type cages generally designated 20 and 21, respectively, and a rotatably mounted filter wheel generally designated 22. More specifically, each of the cages mentioned comprises a plurality of Raman cell chambers respectively containing materials having different stimulated Raman freqencies, each plurality or group of these chambers being mounted between a pair of supporting end plates or discs to form the aforesaid cage-appearing structure. Thus, for cage 20, the end plates are designated 20a and 20b and the Raman cell chambers, such as Raman cell chambers 20c and 20d, are mounted therebetween as shown, the entire structure being mounted on a rotatable shaft 20e. Similarly, for cage 21, the end plates are designated 21a and 21b and mounted therebetween are the Raman cell chambers, such as Raman cell chmbers 21c and 21d, this latter structure likewise being mounted on a rotatable shaft 21e. It will be noted from the figure that structures 20 and 21 are preferably positioned so that one Raman cell chamber from each, such as Raman cell chambers 20c and 21c, will lie in the path of laser beam 10a as in the apparatus of FIG. 1. However, in this case, different Raman cell chambers can be selected for this purpose.

As for filter wheel 22, this device comprises a disc-shaped member 22a having a plurality of openings or windows therethrough in which a plurality of different optical filters are respectively mounted, such as filters 22b and 22c, the entire structure 22 being mounted on a rotatable shaft 22d. As previously mentioned, filters 22 are different from one another, by which is meant that they are designed to pass different frequency components of those generated by the Raman cell chambers described. Toward this end, wheel 22 is mounted so that a selected one of the several filters available will be positioned in the path of light beams 13a and 14a, just as was filter 15 in FIG. 1.

Thus, with the aid of structures 20–22 and the manner in which they are mounted and positioned, a wide range of infra-red frequencies may selectively be generated at the output end of the system. In order to indicate to the user or observer which of the Raman cell chambers and which of the filters are being used, each of the structures is provided with an indexing mechanism respectively designated 23, 24 and 25, indexing mechanism 23 being associated with structure 20, indexing mechanism 24 being associated with structure 21, and indexing mechanism 25 being associated with structure 22. Since indexing mechanisms of the kind required here are so well known and so numerous, it was not deemed necessary to show them in detail and, therefore, they are only schematically presented. Suffice it to say, therefore, that one simple indexing mechanism that could be employed is a disc mounted on each of the shafts with the necessary data for indicating which of the Raman cell chambers and which of the filters are in use provided thereon in registration with either the chambers or the filters.

The technique employed in the FIG. 1 system for obtaining difference frequency generation was that of index matching by colinear transmission through the crystal. However, difference frequency generation may also be obtained by the method of index matching involving vector addition and an arrangement for achieving this type of index matching is shown in FIGS. 3 and 3a. This FIG. 3 arrangement is merely a modification of the FIG. 1 apparatus and involves mounting a rotable mirror 26 in the path of beam 14a, the angle of the mirror being such as to direct the reflected beam toward crystal 16 at the appropriate angle for the desired index matching and, therefore, the desired difference frequency generation.

Considering this aspect of the operation with greater particularity, if the incident fields of beams 13a and 14a are given by the real parts of $$E_1 e^i(\vec{k}_1 \cdot \vec{r} - \omega_1 t)$$

and $$E_2 e^i(\vec{k}_2 \cdot \vec{r} - \omega_2 t)$$

then the difference power produced is proportional to the produce of the fields, viz, $$\vec{E}_1 \vec{E}_2 e^i(\vec{k}_1 - \vec{k}_2) \cdot \vec{r} - i(\omega_1 \omega_2) t$$

and $$\vec{k}_1 - \vec{k}_2 = \vec{k}_d$$

where the propagation constants are $\vec{k}_1, \vec{k}_2, \vec{k}_d$ of the incident beams and the difference frequency, respectively.

It is necessary, therefore, to satisfy the vector relationship among the $k$ vectors. Accordingly, rewriting the propagation vector equation in terms of frequencies $\omega$ and refractive indices $n$, we have $$\frac{\omega_1}{c} n_1 \hat{k}_1 - \frac{\omega_2}{c} n_2 \hat{k}_2 = \frac{\omega_d}{c} n_d \hat{k}_d$$

where the $\hat{k}$'s are unit vectors in the directions of their respective $k$'s. From this equation it can be shown as, for example, by substituting suitable numerical values therein for $\omega$ and $n$, that the vectors on the right hand side have the same order of absolute magnitude as the vectors on the left hand side and this, in turn, indicates or established that it is possible to index match by appropriate vector addition. The method involving vector addition has the advantage of "tuning" over a wide frequency range by changing the direction of the $k_2$ vector through rotation of the mirror. Furthermore, as will be noted from FIG. 3a, this method also allows the difference frequency to be emitted in a direction that is different from the incident beam.

Although a number of particular arrangements of the invention have been illustrated and described above by way of example, it is not intended that the invention be limited thereto. Accordingly, the invention should be considered to include any and all modifications, alterations or equivalent arrangements falling within the scope of the annexed claims.

Having thus described the invention, what is claimed is:

1. A coherent infra-red generator system comprising: a Q-spoiled laser for generating a first beam of light at a first frequency that is higher than those in the infra-red region; means positioned in the path of said first beam of light for producing second and third beams of light therefrom at second and third frequencies, respectively, whose difference is in the infra-red frequency spectrum; and apparatus for mixing said second and third beams together to produce an output beam whose frequency is the difference of said second and third frequencies.

2. The system defined in claim 1 wherein said means includes a pair of Raman cell chambers positioned so that substantially equal portions of said first beam will enter said chambers, the materials respectively contained in said chambers being such as will produce coherent beams at frequencies that include said second and third frequencies.

3. The system defined in claim 1 wherein said means includes first and second groups of Raman cell chambers that respectively contain different materials therein, each of said materials being operable in response to the incidence of said first beam thereon to produce, by means of stimulated Raman scattering, a plurality of coherent sideband frequencies, said first and second groups of Raman cell chambers being mounted so that a selected Raman cell chamber in each group may be positioned in the path of said first beam of light.

4. The system defined in claim 1 wherein said apparatus includes a non-linear optic crystal capable of mixing said second and third beams.

5. The system defined in claim 1 wherein said means includes a pair of Raman cell chambers positioned so that substantially equal portions of said first beam will enter said chambers, the materials respectively contained in said chambers being such as will produce beams at frequencies that include said second and third frequencies; and wherein said apparatus includes a non-linear optic crystal capable of mixing said second and third beams together.

6. The system defined in claim 1 wherein said means includes first and second groups of Raman cell chambers that respectively contain different materials therein, each of said materials being operable in response to the incidence of said first beam thereon to produce, by means of stimulated Raman scattering, a plurality of coherent sideband frequencies, said first and second groups of Raman cell chambers being mounted so that a selected Raman cell chamber in each group may be positioned in the path of said first beam of light; and wherein said apparatus includes a non-linear optic crystal capable of mixing said second and third beams together.

7. The system defined in claim 1 wherein said apparatus includes a non-linear optic crystal capable of mixing said second and third beams together, said crystal being positioned directly in the path of said second beam; and a rotatably mounted mirror positioned directly in the path of said third beam, said mirror being oriented to reflect said third beam to said crystal at a selected angle.

8. The system defined in claim 1 wherein said means includes first and second groups of Raman cell chambers that respectively contain different materials therein, each of said materials being operable in response to the incidence of said first beam thereon to produce, by means of stimulated Raman scattering, a plurality of coherent sideband frequencies, said first and second groups of Raman cell chambers being mounted so that a selected Raman cell chamber in each group may be positioned in the path of said first beam of light; and wherein said apparatus includes a non-linear optic crystal capable of mixing said second and third beams together, said crystal being positioned directly in the path of said second beam, and a rotatably mounted mirror positioned directly in the path of said third beam, said mirror being oriented to reflect said third beam to said crystal at an angle that will produce index matching.

9. The system defined in claim 2 wherein said means further includes an optical filter positioned in the path of the beams produced by said Raman cell materials, said filter being designed to pass only those beams having said second and third frequencies.

10. The system defined in claim 3 wherein said means further includes a plurality of optical filters respectively designed to pass different combinations of beam frequencies, said filters being mounted so that a selected one of them may be positioned in the paths of said second and third beams between said Raman cell chambers and said mixing apparatus.

11. The system defined in claim 4 wherein said crystal is a perovskite-type ferroelectric.

References Cited

UNITED STATES PATENTS

| | | | |
|---|---|---|---|
| 2,720,138 | 10/1955 | Michel et al. | 350—39 |
| 3,229,095 | 1/1966 | Lasher et al. | 331—94.5 XR |
| 3,287,556 | 11/1966 | Good | 331—94.5 XR |
| 3,311,844 | 3/1967 | Di Curcio | 331—94.5 |

OTHER REFERENCES

Giordmaine: "The Interaction of Light With Light," Scientific American; April 1964, pp. 38–49.

Wemple et al.: "Electro-Optic Properties of Some $ABO_3$ Perovskites in the Paraelectric Phase," Applied Physics Letters, Apr. 15, 1964, vol. 4, No. 8, pp. 141–143.

ROY LAKE, Primary Examiner

DARWIN R. HOSTETTER, Assistant Examiner

U.S. Cl. X.R.

321—69; 331—94.5